United States Patent [19]

Ruhl

[11] 3,915,052
[45] Oct. 28, 1975

[54] SELF BROACHING FASTENER ASSEMBLY AND LIKE SELF SIZING FASTENERS

[75] Inventor: John Howland Ruhl, Birmingham, Mich.

[73] Assignee: Huck Manufacturing Company, Detroit, Mich.

[22] Filed: Aug. 22, 1974

[21] Appl. No.: 499,576

[52] U.S. Cl. .......................... 85/7; 85/1 R; 85/32 R
[51] Int. Cl.² ......................................... F16B 19/05
[58] Field of Search .............. 85/7, 5 R, 72, 74, 73, 85/75, 77, 78, 1 R, 32 R; 151/41.73, 2 R; 29/446; 52/758 D, 758 F

[56] References Cited
UNITED STATES PATENTS

| | | | |
|---|---|---|---|
| 2,527,307 | 10/1950 | Huck | 85/70 X |
| 2,895,367 | 7/1959 | Nagy | 85/5 R X |
| 2,972,274 | 2/1961 | Bombard et al. | 85/5 R X |
| 3,630,253 | 12/1971 | Sherman | 151/41.73 |
| 3,709,089 | 1/1973 | Seetaram | 85/77 |
| 3,792,933 | 2/1974 | Stencel | 85/7 |

Primary Examiner—Ramon S. Britts
Attorney, Agent, or Firm—Harness, Dickey & Pierce

[57] ABSTRACT

A new self broaching or mandrelizing fastener assembly.

11 Claims, 8 Drawing Figures

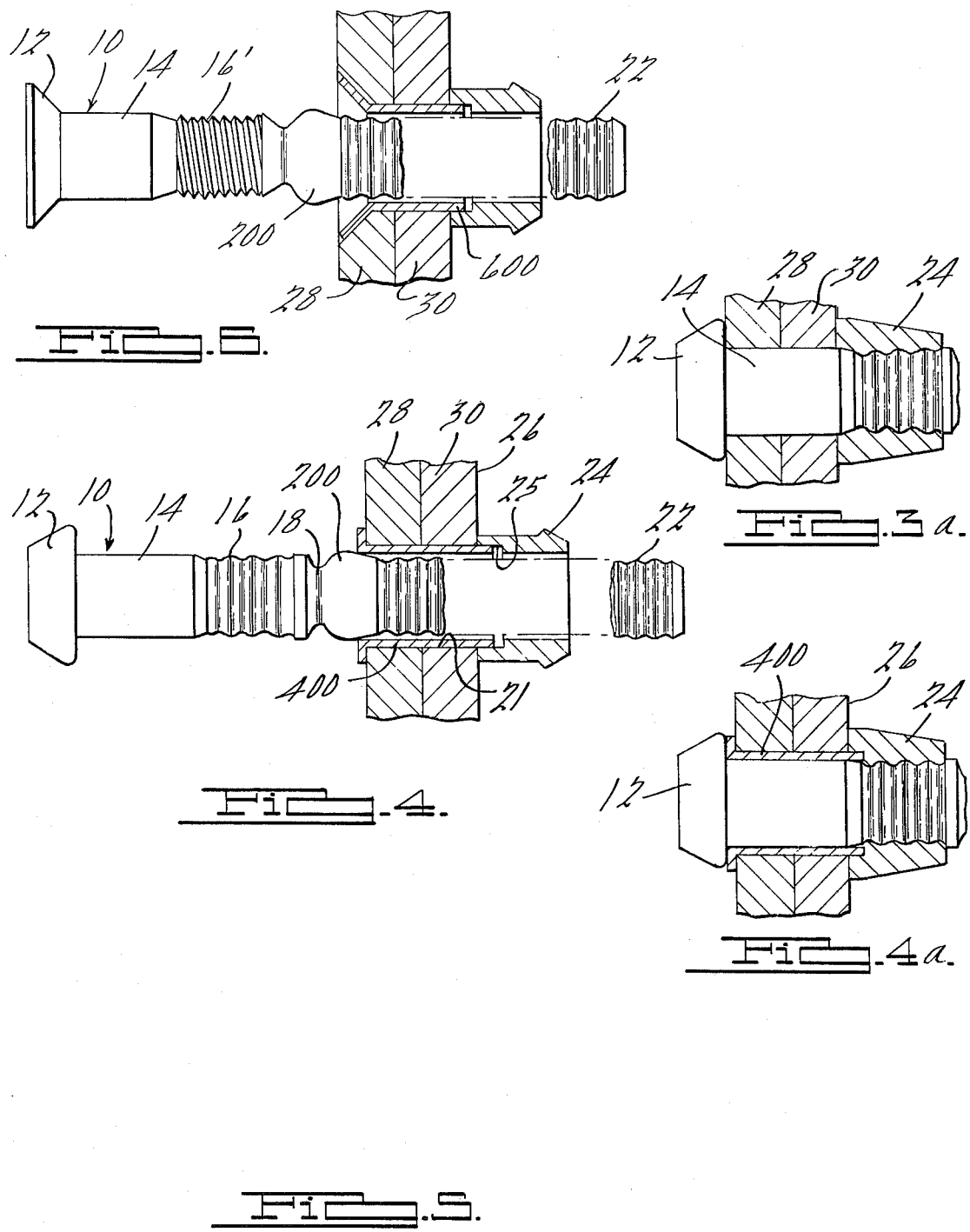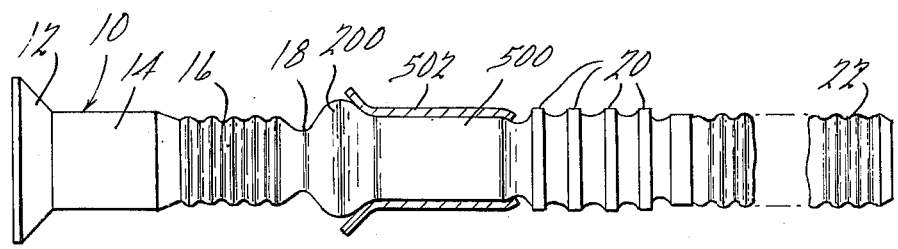

NEW SELF BROACHING FASTENER ASSEMBLY AND LIKE SELF SIZING FASTENERS

BACKGROUND OF THE INVENTION

This invention broadly relates to a new broach bolt and broach collar fastener assembly and also to a new self sizing or mandrelizing fastener assembly.

Accordingly one object of the present invention is to provide a new self sizing fastener assembly.

Another object of the present invention is to provide a new broach bolt and broach collar fastener assembly which can be installed in a single drive operation.

Another object of the present invention is to provide a new broach bolt fastener assembly which can be installed in a single drive operation without the necessity of any intermediate steps for removal of broaching chips.

Another object of the present invention is to provide a new mandrelizing fastener assembly.

Another object of the present invention is to provide a new fastener assembly which utilizes a combination of mandrelizing and broaching members.

Another object of the present invention is to provide a new fastener assembly of the broach bolt type and/or the mandrelizing type which provides a special interference fit between the fastener shank and workpiece hole.

Other objects, features and advantages of the present invention will become apparent from the subsequent description and the appended claims taken in conjunction with the accompanying drawings.

BRIEF DESCRIPTION OF THE DRAWINGS

FIG. 3a shows the fastener assembly of FIG. 2 after installation, FIG. 4 illustrates a fastener in accordance with the invention of the single drive type and includes a mandrelizing member and mandrelizable sleeve, FIG. 4a illustrates the fastener of FIG. 4 after installation, FIG. 5 illustrates a self broaching-mandrelizing-sleeve fastener in accordance with the invention, and FIG. 6 illustrates a mandrelizing-sleeve fastener assembly in accordance with the invention.

SUMMARY OF THE INVENTION

Figure 1:
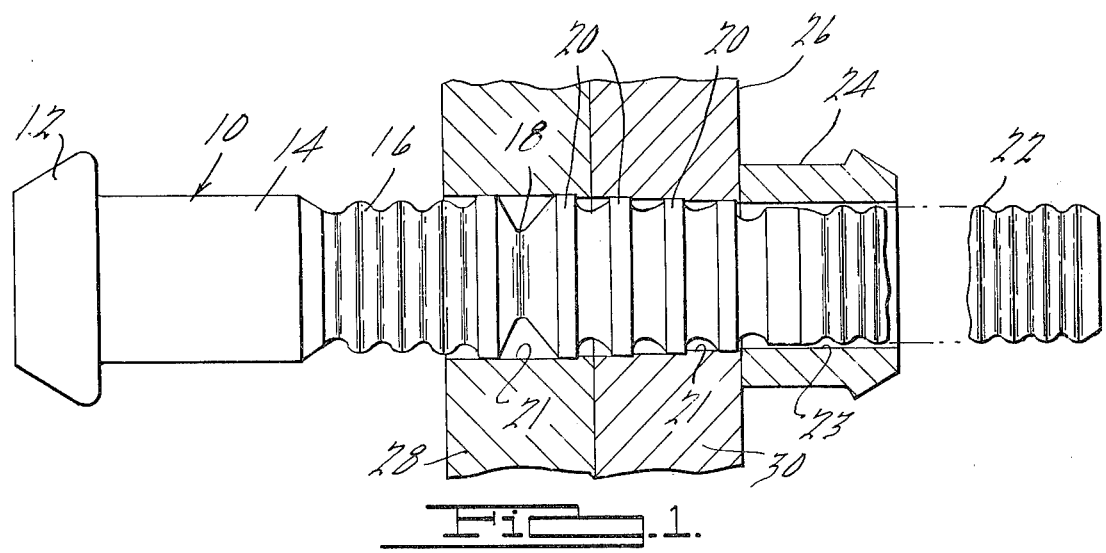
FIG. 1 illustrates a new single drive broach bolt and broach collar fastener assembly in accordance with the invention.

In the past one of the primary reasons for dissatisfaction or lack of usage of self broaching fastener assemblies or self sizing assemblies of either the broaching or mandrelizing type was because of high installation cost and cumbersome installation procedures. Installation procedures have been impractical because of the time involed with cleaning chips away from the broach teeth prior to a second step of collar installation. Chip removal was necessary to avoid the chips from lodging between the collar and the lock grooves.

In accordance with the invention discovered and disclosed herein a special fastener sized collar is used with self hole sizing fasteners such as broach bolts, mandrelizing bolts, or other similar types of fasteners as disclosed herein. The fastener assembly herein is of special construction and the inside workpiece hole diameter is smaller in diameter than the hole sizing dimensions of the fastener with which it is used. This causes the collar to be sized to diameter as well as the clamped workpiece material being sized to the diameter. In particular, with reference to the case of a specially sized collar member being used herein with the special broach bolt of this invention a primary advantage is realized in that the special collar can be installed over the pin tail to pull tool installation and the fastener system herein can then be applied in a single drive operation. Another advantage of the invention is that when the special fastener sized collar herein is used with a mandrel or ball sizing fastener (or a broach sizing fastener) the collar possesses the ability of be forced against the side of the clamped workpiece material during the material sizing activity. This feature essentially prevents formation of backside burrs during sizing and tends to force broaching or ball sizing as desired in the workpiece hole instead of causing extrusion of hole material at the side of the workpiece. The new fastener assemblies in accordance with this invention are also advantageous in that they may be used as fatigue rated fasteners that can be installed on a very economical basic and which perform as well or better than other fatigue rated fastener systems. Still another advantage of the invention is that the self sizing fasteners disclosed herein reduce installation costs by reducing hole preparation expense and by producing more closely controlled hole to pin tolerances than could be held if the holes are drilled to a tolerance and the pins are machined to another tolerance. By machining the pin shank and sizing features at the same time it is possible to essentially eliminate the fit tolerances and thereby produce more uniform fits in accordance with the invention. Mandrelizing pins in accordance with this invention also produce two aadditional advantages. If the mandrelizing member is slightly larger than the original hole and the fastener shank is sized to produce the desired interference fit level there is an advantage over a standard type fastener without a mandrelizing member in reducing insulation forces for interference fit conditions. If the mandrelizing member is considerably larger than the original workpiece hole it can be used to cold work the clamped workpiece to produce residual compression stresses around the hole when a net fit shank is used in the mandrelized hole. These residual compression stresses act to improve the hole fatigue life.

Briefly stated the present invention comprises a single drive broach bolt and broach collar fastener assembly comprising, a pin member with a head and shank at one end and a pull portion at the other end thereof, a plurality of broach teeth means on the pin, lock grooves on the pin intermediate the broach teeth and shank, a broach collar means positioned on the pin at the end opposite the head, said broach teeth means upon being pulled through a workpiece hole broaching same to give a sizing of the hole wherein there is provided an interference fit between about 0.0012 and 0.015 inches when the shank is pulled into the hole, and said broach teeth means upon being pulled through said collar means broaching same and pushing any broaching chips removed from the workpiece hole on through the collar means, all in a single drive operation wherein said collar means is finally swaged into connection with said lock grooves, and without need of any intermediate chip removal operation.

In another aspect briefly stated, the present invention concerns a single drive bolt and collar fastener assembly comprising, a pin member with a head and shank at one end and a pull portion at the other end thereof, self sizing member means on the pin, groove means on the pin intermediate the self sizing means and the shank, a collar means positioned on the pin at the end opposite the head, said self sizing means upon being pulled through a workpiece hole providing a sizing expansion thereof to give a hole size wherein there is provided an interference fit between about 0.0012 and 0.015 inches when the shank is pulled into the hole, and said self sizing means upon being pulled through said collar means centers same, all in a single drive operation wherein said collar means is finally securely fastened to said groove means.

DESCRIPTION OF PREFERRED EMBODIMENTS

A description will now be made with reference to the drawings, however it is not intended that the invention should be limited by the specific embodiments shown in the drawings, wherein like numerals in different drawing figures indicate like elements.

FIG. 1 shows a fastener pin designated 10 which includes a head 12, a shank portion 14, a lock groove portion 16, a breakneck area 18, a plurality of broach teeth 20, and a pull portion or pin tail 22. The fastener is shown prior to a single drive operation with the special fastener sized collar 24 in position adjacent the workpiece sheet line 26 of the workpieces 28, 30. The fastener of FIG. 1 can be clinched and put into a final fastened condition in a single drive operation using any of a number of standard pulling tools, such as for example, a Huck Model 353 pulling tool or its equivalent.

As the broach teeth 20 of the fastener pin 10 are pulled through the workpiece hole 21 the workpiece hole is broached out and any broach chips are pulled through the workpiece hole 21 by the broaching teeth and subsequently the broaching teeth continue through the specially sized collar 24 to broach out the collar hole 23 while the collar 24 is held pressed against the workpiece line 26 by the reaction force of the pulling tool thereagainst. The broaching chips are accordingly drawn through the collar 24, subsequent to which the collar 24 is swaged onto the locking grooves 16. Thus it is seen that the fastener of FIG. 1 is installed in a single drive operation without any intermediate steps of first pulling the broach bolt or broach pin 10 through the hole followed by chip removal and subsequent application of the collar member. In accordance with the invention herein an interference fit is obtained within the range of about 0.0012 to about 0.015 inches. Preferably the invention can be utilized to provide an interference fit within the range of about 0.002 to about 0.010 inches.

Figure 2:
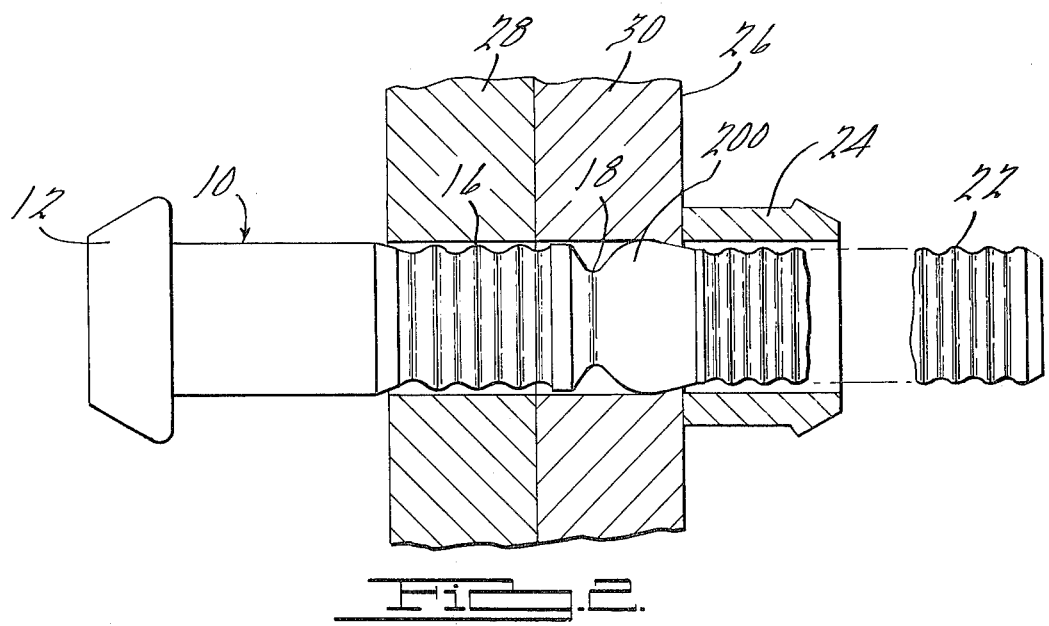
FIG. 2 illustrates a new single drive mandrel type bolt and collar fastener assembly in accordance with the invention.

FIG. 2 illustrates a fastener in accordance with the invention similar to the fastener of FIG. 1 but wherein a mandrel member 200 is substituted in place of the broach teeth 20. In the FIG. 2 fastener assembly the mandrel member is drawn through the workpieces and collar to size both of them in a single drive operation at the conclusion of which the collar member 24 is swaged into a tightly fastened connection with the lock grooves 16. The mandrel member 200 when pasing through the collar 24 centers and/or slightly sizes the collar subsequent to its being swaged into connection with the lock grooves. The FIG. 2 assembly may be used to provide an interference fit within the broad range of about 0.0012 to about 0.015 inches and a preferred interferrence fit may be obtained within the range of about 0.002 to about 0.010 inches.

Figure 3:
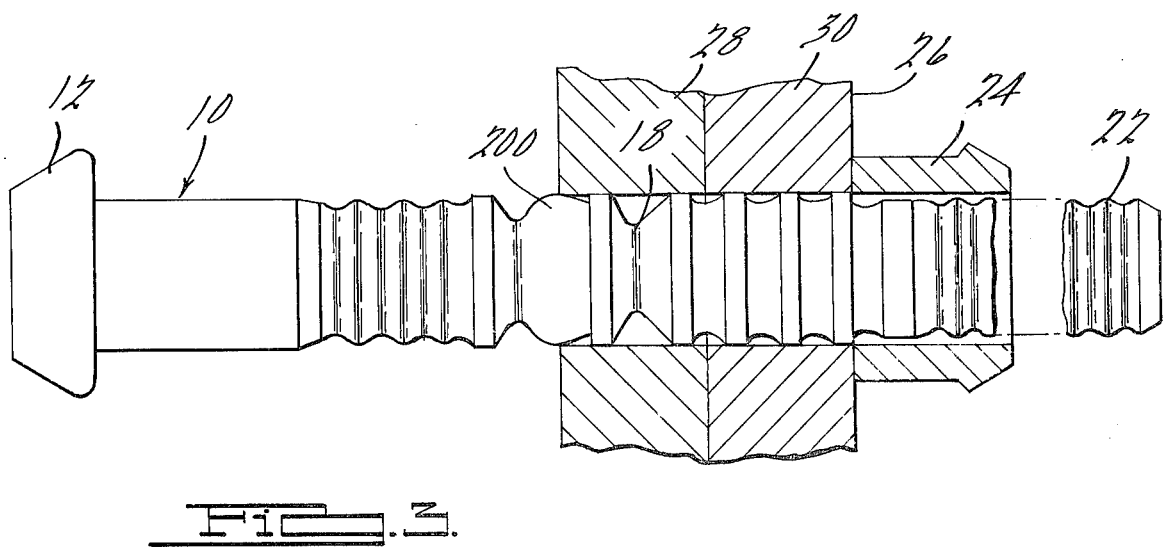
FIG. 3 illustrates a self broaching-mandrelizing fastener assembly for single drive application in accordance with the invention.

FIG. 3 shows a fastener generally similar to FIGS. 1 and 2 but wherein the fastener pin 10 includes a first series of broaching teeth 20 followed by a mandrel member 200. In the embodiment of FIG. 3 the broach teeth 20 are first pulled through the workpiece hole to broach out the interior theeof to the desired dimensions and then any broach chips which result are carred on through by the broach teeth into and through the collar member 24 which is also broached out and centered by the broach teeth 20. Subsequently the following mandrel member carries out final desired sizing of the workpiece hole and the mandrel member also serves to center and/or slightly size the collar member 24 as it passes therethrough. Finally in FIG. 3 the collar member 24 is swaged onto the lock grooves 16 and the fastener pin tail is broken away from the assembly by a final pulling action (of the installation tool being used) to break the fastener pin at the breakneck 18.

FIG. 3a illustrates typically what the appearance would be for a driven fastener installation of a fastener system prepared from any of those shown in FIGS. 1, 2, or 3.

FIG. 4 illustrates a single drive or one step fastener system wherein the fastener also includes a sleeve member 400. The collar 24 also includes a collar recess 25 which provides for grip adjustment in the initial positioning of the fastener on the workpieces 28, 30. In the fastener of FIG. 4 as the mandrel member 200 is pulled through the workpiece hole it mandrelizes of self sizes the sleeve member 400 which in turn sizes the workpiece hole 21. The lock grooves 16 in FIG. 4 are preferably annular grooves of the standard lock groove type, however, optionally there may be used threads instead of the lock grooves 16. The sleeve member 400 is desirable in many instances to prevent galling of the workpiece holes during the mandrelizing of self sizing operation.

FIG. 4a typifies the fastener of FIG. 4 after installation is completed.

FIG. 5 illustrates another fastener in accordance with the invention suitable for driving in a fastener installation as shown for example in FIG. 1. In the fastener of FIG. 5 the fastener pin 10 includes a pull portion 22 followed by a series of broach teeth 20 followed by a land area 500 on which there is positioned a split sleeve member 502 followed by a mandrel member 200, a breakneck 18, a series of lock grooves 16, and the fastener shank 14 and countersunk head 12. In the single drive operation for the FIG. 5 system the broach teeth 20 would be first drawn through the workpiece hole to broach out same and then the broach teeth would pass through the collar member to continue a broaching action with respect thereto and to pull all of the broach chips from the workpiece hole on through the collar member. Subsequent to this the sleeve member 502 would be drawn into the properly self sized workpiece hole and would become lodged therein followed by the mandrel member 200 being drawn through the sleeve member 502 to further size the sleeve and workpiece hole. After the mandrel member is drawn through the sleeve 502 the fastener shank becomes lodged in the workpiece hole and the fastener pull portion is broken off at the breakneck 18, with the collar member subsequently being securely fastened to the lock groove means 16. Preferably standard lock grooves 16 are used in FIG. 5, but threads may optionally be used.

FIG. 6 illustrates a fastening system wherein the fastener pin 10 includes a pull portion 22 followed by a mandrel member 200 followed by a threaded portion 16' followed by the fastener shank 14 countersunk head 12. In the fastening system of FIG. 6 a sleeve 600 is also included in the fastening system and as the fastener pin is drawn through the sleeve 600 the mandrel member 200 mandrelizes or sizes the sleeve 600 through the expansion of which the workpiece hole is also mandrelized or sized to the proper dimension such that the shank portion 14 of the fastener pin fits within the workpiece hole and sleeve as desired and subsequently the collar member is securely fastened to the threaded grooves 16' which may be alternatively used in place of the lock grooves referred to above.

While it will be apparent that the preferred embodiments of the invention disclosed are well calculated to fulfill the objects above stated it will be appreciated that the invention is susceptible to modification, variation and change without departing from the proper scope or fair meaning of the subjoined claims.

What is claimed is:

1. In a joined fastener construction including a workpiece having a hole therein, the improvement of a non-blind type, single drive broach bolt and broach collar fastener means positioned in said hole and being operative to be installed in a single drive operation, said fastener means comprising, a pin member with a head larger than the workpiece hole and shank at one end adjacent the head and a pull portion at the other end thereof projecting from said hole beyond the workpiece, a plurality of broach teeth means on the pin, lock grooves on the pin intermediate the broach teeth and shank, a broach collar means positioned on the pin at the end opposite the head and outside the workpiece hole and adapted to be deformed into said lock grooves, said broach teeth means having a diameter greater than that of the workpiece hole whereby upon being pulled through the workpiece hole, the hole is broached to give a sizing of the hole wherein there is provided an interference fit between about 0.0012 and 0.015 inches when the shank is pulled into the hole, and said collar having an inside diameter less than the diameter of the broach teeth so that the collar is broached when the broach teeth means is pulled therethrough, and, any broaching chips removed from the workpiece hole are pushed on through the collar means, all in a single drive operation wherein said collar means is finally swaged intot connection with said lock grooves, and without need of any intermediate chip removal operation.

2. The invention of claim 1 wherein,
said interference fit is between about 0.002 and 0.010 inches.

3. In a joined fastener construction including a workpiece having a hole therein, the improvement of a non-blind type, single drive bolt and collar fastener means positioned in said hole and being operative to be installed in a single drive operation, said fastener means comprising, a pin member with a head larger than the workpiece hole and shank at one end adjacent the head and a pull portion at the other end thereof projecting from said hole beyond the workpiece, self sizing member means on the pin, lock groove means on the pin intermediate the self sizing means and the shank, a collar means positioned on the pin at the end opposite the head and outside the workpiece hole and adapted to be deformed into said lock grooves, said self sizing means having a diameter greater than that of the workpiece hole whereby upon being pulled through the workpiece hole, the hole is size expanded to give a hole size wherein there is provided an interference fit between about 0.0012 and 0.015 inches when the shank is pulled into the hole, and said sizing means upon being pulled through said collar means centers same, all in a single drive operation wherein said collar means is finally securely fastened to said groove means, and said collar having an inside diameter less than the diameter of the sizing means so that the collar is sized when the sizing means is pulled therethrough.

4. The invention of claim 3 wherein,
said interference fit is between about 0.002 and 0.010 inches.

5. The invention of claim 3 wherein,
said self sizing means is a mandrel member having a diameter slightly greater than the diameter of the workpiece hole and slighly less than the diameter of said shank.

6. The invention of claim 3 wherein,
said mandrel also sizes said collar.

7. The invention of claim 3 wherein,
said self sizing means is a mandrel member having a diameter slightly greater than the diameter of the workpiece hole and also slightly greater than the diameter of said shank and wherein said workpiece hole contracts upon said shank after it is pulled into the hole.

8. The invention of claim 3 wherein,
said self sizing means includes a plurality of broach teeth and a following mandrel member,
and wherein the broach teeth upon being pulled through said collar means broaching same and pushing any broaching chips removed from the workpiece hole on through the collar means.

9. The invention of claim 3 wherein,
said fastener assembly also includes a mandrellizing sleeve,
said sleeve being in the workpiece hole at completion of the drive operation.

10. The invention of claim 9 wherein,
said self sizing means includes a plurality of broach teeth and a following mandrel member,
and said sleeve is a split sleeve positioned intermediate said broach teeth and mandrel member prior to the drive operation.

11. In a joined fastener construction including a workpiece having a hole therein, the improvement of a non-blind type, single drive bolt and collar fastener means positioned in said hole and being operative to be installed in a single drive operation, said fastener means comprisng,
- a pin member with a head larger than the workpiece hole and shank at one end adjacent the head and a pull portion at the other end thereof projecting from said hole beyond the workpiece,
- self sizing member means on the pin,
- lock grooves on the pin for fastening to a collar,
- a collar means positioned on the pin at the end opposite the head and outside the workpiece hole and adapted to be deformed into said lock grooves,
- said self sizing means having a diameter greater than that of the workpiece hole whereby upon being pulled through the workpiece hole, the hole is size expanded to give a hole size wherein there is provided
- an interference fit between about 0.0012 and 0.015 inches when the shank is pulled into the hole,
- and said self sizing means upon being pulled through said collar means centers same, all in a single drive operation wherein said collar means is finally securely fastened to said groove means,
- and said collar having an inside diameter less than the diameter of the sizing means so that the collar is sized when the sizing means is pulled therethrough.

* * * * *

UNITED STATES PATENT OFFICE
CERTIFICATE OF CORRECTION

PATENT NO. : 3,915,052
DATED : October 28, 1975
INVENTOR(S) : John Howland Ruhl

It is certified that error appears in the above-identified patent and that said Letters Patent are hereby corrected as shown below:

Column 2, line 13, after the word "pin tail" insert the word -- prior --;
Column 2, line 18, the words "of be" should read as -- to be --;
Column 2, line 27, the word "basic" should read as -- basis --;
Column 4, line 13, the word "theeof" should read as -- thereof --;
Column 4, line 14, the word "carred" should read as -- carried --;
Column 5, line 59 (Claim 1) the word "intot" should read as -- into --;
Column 6, line 21 (Claim 3) after the word "said" insert the word -- self --.

Signed and Sealed this tenth Day of February 1976

[SEAL]

Attest:

RUTH C. MASON
Attesting Officer

C. MARSHALL DANN
Commissioner of Patents and Trademarks